US005976305A

United States Patent [19]
Bhat et al.

[11] Patent Number: 5,976,305
[45] Date of Patent: Nov. 2, 1999

[54] PROCESS FOR BONDING TWO SUBSTRATES TOGETHER WITH A ONE-PART MOISTURE CURABLE POLYURETHANE ADHESIVE

[75] Inventors: Shailesh S. Bhat, Troy, Mich.; Sidky D. Rizk, Westfield, N.J.

[73] Assignee: The Dow Chemical Company, Midland, Mich.

[21] Appl. No.: 08/859,810

[22] Filed: May 19, 1997

Related U.S. Application Data

[62] Division of application No. 08/585,223, Jan. 11, 1996.

[51] Int. Cl.$^6$ .................................................. C09J 4/00
[52] U.S. Cl. ..................... 156/331.4; 156/108; 523/205; 523/207; 525/131
[58] Field of Search ............................... 156/331.4, 108; 523/205, 207; 525/131

[56] References Cited

U.S. PATENT DOCUMENTS

| | | | |
|---|---|---|---|
| 3,325,421 | 6/1967 | Muller et al. | 252/308 |
| 3,627,722 | 12/1971 | Selter et al. | 260/37 |
| 3,707,521 | 12/1972 | De Santis et al. | 260/37 |
| 3,743,626 | 7/1973 | Emmons | 260/77.5 |
| 3,779,794 | 12/1973 | De Santis | 117/72 |
| 4,002,601 | 1/1977 | Hajek et al. | 260/77.5 |
| 4,093,569 | 6/1978 | Reischl et al. | 260/2.5 |
| 4,101,527 | 7/1978 | Cunningham et al. | 528/73 |
| 4,118,376 | 10/1978 | Pedain et al. | 528/59 |
| 4,148,840 | 4/1979 | Shah | 260/859 |
| 4,192,937 | 3/1980 | Noll et al. | 528/59 |
| 4,193,832 | 3/1980 | Reischl et al. | 156/331 |
| 4,261,852 | 4/1981 | Carroll et al. | 528/59 |
| 4,284,751 | 8/1981 | Hutt et al. | 528/45 |
| 4,345,053 | 8/1982 | Rizk et al. | 525/440 |
| 4,357,430 | 11/1902 | VanCleve | 521/128 |
| 4,373,082 | 2/1983 | Kimball et al. | 528/60 |
| 4,374,237 | 2/1983 | Berger et al. | 528/28 |
| 4,390,645 | 6/1983 | Hoffman et al. | 521/137 |
| 4,396,681 | 8/1983 | Rizk et al. | 428/423 |
| 4,400,497 | 8/1983 | Blum et al. | 528/45 |
| 4,483,974 | 11/1984 | Grögler et al. | 528/68 |
| 4,496,706 | 1/1985 | Chang | 156/331.4 |
| 4,511,626 | 4/1985 | Schmacher | 428/425 |
| 4,539,345 | 9/1985 | Hansen | 523/219 |
| 4,549,005 | 10/1985 | Goel | 528/53 |
| 4,555,561 | 11/1985 | Sugimori et al. | 528/26 |
| 4,595,445 | 1/1986 | Hombach et al. | 156/307 |
| 4,625,012 | 11/1986 | Rizk et al. | 528/28 |
| 4,626,475 | 12/1986 | Goel et al. | 428/423.1 |
| 4,643,794 | 2/1987 | Saracsan et al. | 156/310 |
| 4,667,008 | 5/1987 | Grögler et al. | 528/67 |
| 4,681,926 | 7/1987 | Goel | 528/48 |
| 4,695,596 | 9/1987 | Berkowitz | 521/137 |
| 4,710,560 | 12/1987 | Vu | 528/67 |
| 4,720,536 | 1/1988 | House et al. | 528/60 |
| 4,728,710 | 3/1988 | Goel | 528/58 |
| 4,745,137 | 5/1988 | Thomas et al. | 525/131 |
| 4,758,648 | 7/1988 | Rizk et al. | 528/53 |
| 4,778,845 | 10/1988 | Tschan et al. | 524/710 |
| 4,780,520 | 10/1988 | Rizk et al. | 528/53 |
| 4,879,853 | 11/1989 | Braendle et al. | 52/208 |
| 4,950,715 | 8/1990 | Duck et al. | 525/127 |
| 4,985,491 | 1/1991 | Reisch | 524/875 |
| 5,015,321 | 5/1991 | Jassen et al. | 156/331.7 |
| 5,018,337 | 5/1991 | Carter et al. | 53/458 |
| 5,082,736 | 1/1992 | Bravet et al. | 428/425 |
| 5,102,969 | 4/1992 | Scheffler et al. | 523/211 |
| 5,126,421 | 6/1992 | Majewski et al. | 528/44 |
| 5,143,987 | 9/1992 | Hänsel et al. | 525/458 |
| 5,143,995 | 9/1992 | Meckel et al. | 528/59 |
| 5,194,488 | 3/1993 | Piestert et al. | 524/703 |
| 5,272,204 | 12/1993 | Akimoto et al. | 524/700 |
| 5,279,882 | 1/1994 | Daude et al. | 428/192 |
| 5,290,853 | 3/1994 | Regan | 524/779 |
| 5,473,043 | 12/1995 | Maki et al. | 528/60 |
| 5,488,085 | 1/1996 | Hayes et al. | 525/53 |

FOREIGN PATENT DOCUMENTS

| | | |
|---|---|---|
| 2049695 | 2/1993 | Canada . |
| 0082528 | 6/1983 | European Pat. Off. . |
| 0494824 | 7/1992 | European Pat. Off. . |
| 4025776 | 2/1992 | Germany . |
| 4111654 | 10/1992 | Germany . |
| 9418255 | 8/1994 | Germany . |
| 63045242 | 2/1988 | Japan . |
| 63046212 | 2/1988 | Japan . |
| 63245485 | 10/1988 | Japan . |
| 0035494 | 2/1994 | Switzerland . |
| 1575666 | 11/1977 | United Kingdom . |

OTHER PUBLICATIONS

Derwent, 94–062109/08.
Derwent, 88–060442–09.
Derwent, 86–202392/31.
Derwent, 77–65225Y/37.

*Primary Examiner*—John J Gallagher
*Attorney, Agent, or Firm*—Norman L. Sims

[57] ABSTRACT

The invention is a process for bonding two substrates together which comprises contacting an adhesive composition comprising a polyurethane prepolymer comprising the reaction product of: A) a polyisocyanate; B) one or more compounds or polymers having isocyanate-reactive moieties; C) a dispersion triol containing from about 10 to about 60 percent by weight based on the dispersion of particles of an organic polymer which is nonreactive with the polyols and polyisocyanates having a particle size of from about 5 to about 50 microns; wherein the prepolymer has a free isocyanate content of from about 0.8 to about 2.2 percent; with at least one of the substrates and contacting the substrates together along the portion of the substrate(s) to which the adhesive has been applied before the adhesive applied cures and allowing the adhesive to cure and bond the substrates together.

8 Claims, No Drawings

PROCESS FOR BONDING TWO SUBSTRATES TOGETHER WITH A ONE-PART MOISTURE CURABLE POLYURETHANE ADHESIVE

CROSS-REFERENCE TO RELATED APPLICATION

This is a divisional of application Ser. No. 08/585,223 filed Jan. 11, 1996.

BACKGROUND OF THE INVENTION

This application relates to a one-part polyurethane based adhesive useful in bonding porous and nonporous materials. The adhesive is especially useful in bonding glass into window frames, for example windshields into automobiles.

Polyurethane adhesive compositions typically comprise at least one urethane prepolymer. Adhesives useful for bonding to nonporous substrates, such as glass, to metal, are well-known. When glass is installed in automobiles on a production line, a one-part moisture curable polyurethane adhesive is preferably used, as the equipment needed for the application of such an adhesive in an automobile assembly plant is less expensive than the equipment needed to apply a two-part adhesive. One part polyurethane adhesives are disclosed in U.S. Pat. Nos. 4,374,237 and 4,687,533 incorporated herein by reference.

In the automotive after-market replacement industry, glass is often bound into automobiles through the use of two-part moisture curable polyurethane adhesives. Two-part polyurethane adhesives are used because they offer rapid initial cure allowing for rapid drive-away times. Two-part adhesives require special applicators which mix the two parts in specific proportions immediately prior to application. These applicators are more difficult to and costly to use than applicators used for one-part adhesives. Further, the improper application or mixing of two-part adhesives can result in poor adhesion. Two-part polyurethane adhesives are well known, U.S. Pat. No. 4,835,012, incorporated herein by reference, and DE 4,210,277.

In addition the market demands simpler application systems and faster curing adhesives which allow even faster drive-away times. If the adhesive cures too rapidly, then the window installer loses the necessary time to install and properly place the glass into the frame before the adhesive becomes too intractable to work with. Working time is defined as the period from application of adhesive until the adhesive becomes too intractable to work.

Future regulations in the U.S. will require dual airbags in vehicles. During crashes the airbags inflate and exert additional pressure on the windshield. Federal Transportation Agency regulations require that windshield remain in place at crashes of up to 30 mph (48 KPH). This requires adhesives which have enhanced strength at the drive-away time. To meet such a standard, the lap shear strengths of the adhesive should be preferably 150 psi (1033 kPa) or greater as determined according to ASTM D-3163 and demonstrate impact energy strength of 9 ft-lbs (12.2 Joules) or greater at the designated drive-away time.

Therefore, what is needed is a one-part polyurethane adhesive which facilitates faster drive-away time, which meets the strength and impact requirements defined above and which still provides for a reasonable working time to facilitate proper placement of glass in window frames. What is also needed is a one-part system which meets these requirements so that the disadvantages of the two-part systems can be avoided.

SUMMARY OF THE INVENTION

The present invention is a polyurethane prepolymer comprising the reaction product of A) one or more polyisocyanate;

B) one or more compounds containing on average more than one isocyanate reactive compound;

C) a dispersion triol containing from about 10 to about 60 percent by weight based on the dispersion of particles of an organic polymer which is nonreactive with the isocyanate reactive compounds and the polyisocyanates, and having a particle size of from about 5 to about 50 microns;

wherein the prepolymer has a free isocyanate content of from about 0.8 to about 2.2 percent.

In another embodiment the invention is a one-part adhesive composition comprising the polyurethane prepolymer of the invention and a catalyst capable of catalyzing the reaction of isocyanate moieties with water.

In another embodiment the invention is a process for bonding two substrates together which comprises contacting the adhesive composition of the invention with at least one of the substrates and contacting the substrates together along the portion of the substrate(s) to which the adhesive has been applied before the adhesive applied cures and allowing the adhesive to cure and bond the substrates together.

The adhesive of this invention provides reasonable drive-away times for replacement glass it bonds into automobiles. Such drive-away times are preferably about 60 minutes and more preferably about 30 minutes from application of the adhesive. The adhesive of the invention also provides reasonable working times, preferably about 6 to about 15 minutes, and more preferably about 10 to about 12 minutes. Additionally the lap shear strengths and the impact energy strengths of the adhesive at the drive-away time are preferably about 150 psi (1033 kPa) or greater and more preferably about 250 psi (1723 kPa) or greater according to ASTM D-3163 and 9.0 ft-lbs (12.2 Joules) or greater, respectively. Additionally, many of the problems associated with two-part adhesives described before are eliminated.

DETAILED DESCRIPTION OF THE INVENTION

The urethane prepolymers have an average isocyanate functionality sufficient to allow the preparation of a crosslinked polyurethane upon cure and not so high that the polymers are unstable. Stability in this context means that the prepolymer or adhesive prepared from the prepolymer has a shelf life of at least 6 months at ambient temperatures, in that it does not demonstrate an increase in viscosity during such period which prevents its application or use. Preferably the prepolymer or adhesive prepared therefrom does not undergo an increase in viscosity of more than about 50 percent during the stated period. Preferably, the average isocyanate functionality is at least about 2.2 and preferably at least about 2.4. Below about 2.2 the ability of the prepolymer to crosslink sufficiently to achieve the desired strength of the cured adhesive is compromised. Preferably the average isocyanate functionality of the prepolymer is 3.0 or less and more preferably 2.8 or less. Above 3.0 average isocyanate functionality the prepolymer and adhesives prepared from the prepolymer may exhibit unacceptable stability. The prepolymer preferably has a free isocyanate content which facilitates acceptable strength in adhesives prepared from the prepolymers after 60 minutes and stability of the prepolymer. Preferably, the free isocyanate content is about 0.8 percent by weight or greater based on the weight of the prepolymer, more preferably about 1.0 percent by weight or greater, even more preferably about 1.2 percent by weight or greater and most preferably about 1.4 percent by weight or greater, and preferably about 2.2 percent by weight or less, even more preferably about 2.1 percent by weight or less and most preferably about 1.8 percent by weight or less. Above about 2.2 percent by weight the adhesives prepared from the prepolymer may demonstrate lap shear strengths after 60 minutes which are too low for the intended use and foaming during cure of the adhesive prepared from the prepolymer may occur. Below about 0.8 percent by weight the prepolymer may exhibit instability, for instance by gelling within 3 days. Preferably, the weight average molecular weight of the prepolymer is about 3,000 or greater, more preferably about 4,000 or greater, even more preferably about 5,000 or greater and most preferably about 6,000 or greater; and is preferably about 20,000 or less, more preferably about 15,000 or less, even more preferably about 10,000 or less and most preferably 8,000 or less. The prepolymer preferably exhibits a viscosity which facilitates formulation of a pumpable adhesive which has good green strength. Preferably the viscosity of the prepolymer is about 20,000 centipoise or less and more preferably about 13,000 or less, preferably about 3,000 or greater, and more preferably about 6,000 centipoise or greater and most preferably about 8,000 centipoise or greater. The viscosity of the adhesive can be adjusted with fillers although the fillers cannot improve the green strength of the final adhesive. Below about 3,000 centipoise the adhesive prepared from the prepolymer may exhibit poor green strength. Above about 20,000 the prepolymer may be unstable and subject to gelling. The prepolymer may be prepared by any suitable method, such as by reacting one or more compounds containing on average more than one, and preferably at least about two, isocyanate-reactive groups and a dispersion triol with an excess over stoichiometry of one or more polyisocyanates under reaction conditions sufficient to form a prepolymer having isocyanate functionality and free isocyanate content which meets the criteria discussed above.

Preferable polyisocyanates for use in preparing the prepolymer include any aliphatic, cycloaliphatic, arylaliphatic, heterocyclic or aromatic polyisocyanate, or mixture thereof, with an average isocyanate functionality of at least about 2.0 and an equivalent weight of at least about 80. Preferably, the isocyanate functionality of the polyisocyanate is at least about 2.0, more preferably at least about 2.2, and is more preferably at least about 2.3; and is preferably no greater than about 4.0, more preferably no greater than about 3.5, and is most preferably no greater than about 3.0. Higher functionalities may also be used, but their use may cause excessive crosslinking, resulting in an adhesive which is too viscous to handle and apply easily, can cause the cured adhesive to be too brittle and cause foaming due to carbon dioxide gassing. Preferably, the equivalent weight of the polyisocyanate is at least about 100, more preferably at least about 110, and is more preferably at least about 120; and is preferably no greater than about 300, more preferably no greater than about 250, and is most preferably no greater than about 200.

Examples of such polyisocyanates include ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3- and 1,4-diisocyanate and mixtures of these isomers; 1-isocyanato-3,3,5-trimethyl-5-isocyanato methyl cyclohexane; 2,4- and 2,6-hexahydrotolylene diisocyanate and mixtures of these isomers, hexahydrol,3- and/or 1,4-phenylene diisocyanate, perhydro-2,5'- and/or 4,4'-diphenyl methane diisocyanate, 1,3- and 1,4-phenylene diisocyanate, 2,4- and 2,6-tolylene diisocyanate and mixtures of these isomers, diphenyl methane-2,4'- and/or 4,4'-diisocyanate, naphthylene-1,5-diisocyanate, triphenyl methane-4,4',4'-triisocyanate, polyphenyl polymethylene polyisocyanates of the type obtained by condensing aniline with formaldehyde, followed by phosgenation such as described in British Patents 874,430 and 848,671, perchlorinated aryl polyisocyanates as described in German Auslegeschrift 1,157,601, polyisocyanates containing carbodiimide groups as described in German Patent 1,092,007, diisocyanates of the type described in U.S. Pat. No. 3,492,330 (relevant parts incorporated herein by reference), polyisocyanates containing allophanate groups of the type described in British Patent 994,890, Belgian Patent 761,626 and Dutch Patent Application No. 7,102,524, polyisocyanates containing isocyanurate groups as described in German Patents 1,022,789, 1,222,067, 1,027, 394, 1,929,034 and 2,004,048, polyisocyanates containing urethane groups as described in Belgian Patent 752,261 or U.S. Pat. No. 3,394,164 (relevant parts incorporated herein by reference), polyisocyanates containing acrylated urea groups as in German Patent 1,230,778, polyisocyanates containing biuret groups as described in German Patent 1,101,392, British Patent 889,050 and French Patent 7,017, 514, polyisocyanates obtained by telomerization reactions described in Belgian Patent 723,640, polyisocyanates containing ester groups as described in British Patents 965,474 and 1,072,956, U.S. Pat. No. 3,567,763 (relevant parts incorporated herein by reference) and German Patent 1,231, 688 and reaction products of the aforementioned isocyanates with acetals as described in German Patent 1,072,385. Preferably the polyisocyanate is an aromatic or cycloaliphatic polyisocyanate such as diphenylmethane-4, 4'-diisocyanate, isophorone diisocyanate, tetramethylxylene diisocyanate, and is most preferably diphenylmethane-4,4'-diisocyanate.

The polyisocyanates are used in a sufficient amount to form an advanced polyurethane prepolymer having free reactive isocyanate moieties. Preferably the amount of polyisocyanate is about 5 percent by weight or greater based on the starting materials and more preferably about 9 percent by weight or greater and preferably about 20 percent by weight or less, more preferably about 15 percent by weight or less and even more preferably 11 percent by weight or less.

The term "isocyanate-reactive compound" as used herein includes water and any organic compound having on average more than one, preferably at least about two, and preferably no more than about 4, isocyanate-reactive moieties, such as a compound containing an active hydrogen moiety or an imino-functional compound. For the purposes of this invention, an active hydrogen moiety refers to a moiety containing a hydrogen atom which, because of its position in the molecule, displays significant activity according to the Zerewitnoff test described by Wohler in the Journal of the American Chemical Society, Vol. 49, p. 3181 (1927). Illustrative of such active hydrogen moieties are —COOH, —OH, —NH$_2$, —NH—, —CONH$_2$, —SH, and —CONH—. Typical active hydrogen-containing compounds include polyols, polyamines, polymercaptans, polyacids and compounds containing at least one oxazolidine moiety. Suitable imino-functional compounds are those which have at least one terminal imino group per molecule, such as are described, for example, in U.S. Pat. No. 4,910, 279, which is hereby incorporated by reference in its entirety.

Preferable isocyanate-reactive compounds are polyols. The term polyol as used herein includes any organic compound having on average more than one and preferably at least about two, and preferably no more than about four, isocyanate-reactive hydroxyl moieties.

Preferable polyols useful in the preparation of the prepolymers include, for example, polyether polyols, polyester polyols, poly(alkylene carbonate)polyols, hydroxyl-containing polythioethers, polymer polyols, and mixtures thereof. Polyether polyols are well-known in the art and include, for example, polyoxyethylene, polyoxypropylene, polyoxybutylene, and polytetramethylene ether diols and triols which are prepared by reacting an unsubstituted or halogen- or aromatic-substituted alkylene oxide with an initiator compound containing two or more active hydrogen groups such as water, ammonia, a polyalcohol, or an amine. Such methods are described, for example, in U.S. Pat. Nos. 4,269,945; 4,218,543; and 4,374,210; which are herein incorporated by reference in their entirety. In general, polyether polyols may be prepared by polymerizing alkylene oxides in the presence of an active hydrogen-containing initiator compound.

Preferable alkylene oxides include ethylene oxide, propylene oxide, butylene oxides, styrene oxide, epichlorohydrin, epibromohydrin, and mixtures thereof. Preferable initiator compounds include water, ethylene glycol, propylene glycol, butanediol, hexanediol, glycerin, trimethylol propane, pentaerythritol, hexanetriol, sorbitol, sucrose, hydroquinone, resorcinol, catechol, bisphenols, novolac resins, phosphoric acid, amines, and mixtures thereof.

Polyester polyols are also well-known in the art and may be prepared by reacting a polycarboxylic acid or anhydride thereof with a polyhydric alcohol. Examples of preferable polycarboxylic acids include succinic acid, adipic acid, suberic acid, azelaic acid, sebacic acid, phthalic acid, isophthalic acid, maleic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, maleic acid anhydride, glutaric acid anhydride, fumaric acid, and mixtures thereof. Examples of preferable polyhydric alcohols useful in preparing polyester polyols include ethylene glycols, propane diols, butane diols, 1,6-hexanediol, 1,8-octanediol, neopentylglycol, glycerol, trimethylol propane, pentaerythritol, quinitol, mannitol, sorbitol, methyl glycoside, diethylene glycol, triethylene glycol, tetraethylene glycol, polyethylene glycols, polypropylene glycols, and mixtures thereof.

Preferable polymer polyols include dispersions of polymers of vinyl monomers in a continuous polyol phase, particularly dispersions of styrene/acrylonitrile copolymers. Also useful are the so-called polyisocyanate polyaddition (PIPA) polyols (dispersions of polyurea-polyurethane particles in a polyol) and the polyurea dispersions in polyols (PHD polyols). Copolymer polyols of the vinyl type are described, for example, in U.S. Pat. Nos. 4,390,645, 4,463,107, 4,148,840 and 4,574,137, all incorporated herein by reference.

Preferably, the polyol(s) have an average functionality of at least about 1.5, more preferably at least about 1.8 and most preferably at least about 2.0; and is preferably no greater than about 4.0, more preferably no greater than about 3.5 and most preferably no greater than about 3.0. Preferably, the equivalent weight of the polyol(s) is at least about 200, more preferably at least about 500 and more preferably at least about 1,000; and is preferably no greater than about 3,500, more preferably no greater than about 3,000 and most preferably no greater than about 2,500.

Preferably the polyol is a mixture of one or more diols and one or more triols. Preferably the one or more polyols are polyether polyols and more preferably polyoxyalkylene oxide polyols. Most preferred, however, are ethylene oxide-capped polyols prepared by reacting glycerine with propylene oxide, followed by reacting the product with ethylene oxide.

The polyols are present in an amount sufficient to react with most of the isocyanate groups of the isocyanates leaving enough isocyanate groups to correspond with the desired free isocyanate content of the prepolymer. Preferably the polyols are present in an amount of about 25 percent by weight or greater based on the prepolymer, more preferably about 42 percent by weight or greater and most preferably 48 percent by weight or greater. Preferably the polyols are present in an amount of about 70 percent by weight or less based on the prepolymer, more preferably about 58 percent by weight or less and most preferably 52 percent by weight or less. In the embodiment where the polyols comprise a mixture of diols and triols the amount of diols present is preferably about 10 percent by weight or greater based on the prepolymer, more preferably about 17 percent by weight or greater and most preferably 19 percent by weight or greater; and about 30 percent by weight or less based on the prepolymer, more preferably about 23 percent by weight or less and most preferably 21 percent by weight or less. In the embodiment where the polyols comprise a mixture of diols and triols the amount of triols present is preferably about 15 percent by weight or greater based on the prepolymer, more preferably about 25 percent by weight or greater and most preferably 28 percent by weight or greater; and preferably about 40 percent by weight or less based on the prepolymer, more preferably about 35 percent by weight or less and most preferably 32 percent by weight or less. The proportion of diol to triol is chosen to achieve the desired isocyanate functionality of the prepolymer.

The prepolymer also comprises a dispersion triol having dispersed therein particles of an organic based polymer. The organic based polymer particles are chosen so as to not be reactive with the isocyanate-reactive moieties or isocyanate moieties of the isocyanates. Preferably the particles comprise a thermoplastic polymer, rubber-modified thermoplastic polymer or a polyurea dispersed in a triol. The polyurea preferably comprises the reaction product of a polyamine and a polyisocyanate. Preferable thermoplastic polymers are those based on monovinylidene aromatic monomers and copolymers of monovinylidene aromatic monomers with conjugated dienes, acrylates, methacrylates, unsaturated nitrites or mixtures thereof. The copolymers can be block or random copolymers. More preferably the particles dispersed in the triol comprise copolymers of unsaturated nitrites, conjugated dienes and a monovinylidene aromatic monomer, a copolymer of an unsaturated nitrile and a monovinylidene aromatic monomer or a polyurea. Even more preferably the particles comprise a polyurea or polystyrene-acrylonitrile copolymer with the polystyrene-acrylonitrile copolymers being most preferred.

The organic polymer particles useful in this invention described hereinbefore are commonly available and well-known to those skilled in the art.

Representative monovinylidene aromatic compounds which can be employed herein include styrene, alkyl-substituted styrenes (e.g., alpha-methylstyrene and alpha-ethylstyrene) and ring-substituted styrenes (e.g., vinyl toluene, particularly para-vinyltoluene, ortho-ethylstyrene and 2,4-dimethylstyrene); ring-substituted halogenated styrenes such as chlorostyrene and 2,4-dichlorostyrene; styrenes substituted with both a halo and an alkyl group such as 2-chloro-4-methylstyrene and vinylanthracene. In general, the preferred monovinylidene aromatic compound (s) employed in preparing the styrenic polymer resin is styrene or a combination of styrene and alpha-methylstyrene (advantageously such combinations contain alpha-methylstyrene in amounts from about 10 to about 50, more advantageously from about 15 to 40, weight percent of the total weight of the styrene and alpha-methylstyrene); with styrene being the most preferred monovinylidene aromatic compound.

Conjugated dienes useful in the block copolymer include straight- and branched-chain aliphatic hydrocarbons containing two double bonds attached to adjacent carbon atoms. Preferred dienes contain 4 to 6 carbon atoms and include butadiene, isoprene, 1,3-pentadiene, 1,3-hexadiene, 2,3-dimethylbutadiene and mixtures thereof. More preferably, such conjugated dienes contain from about 4 to about 5 carbon atoms and include, for example, butadiene, isoprene, cis-1,3-pentadiene, trans-1,3-pentadiene and mixtures thereof. The most preferred dienes are butadiene and isoprene.

Preferred unsaturated nitrites useful herein include acrylonitrile, ethacrylonitrile, methacrylonitrile and mixtures thereof, more preferred is acrylonitrile. In preparing copolymers useful in this invention, the amount of the unsaturated nitrile(s) most advantageously employed will vary depending on the physical and chemical properties desired in the copolymer particles. The copolymer will advantageously be derived from about 5 to about 35, preferably from about 15 to about 25, weight percent of the unsaturated nitrile(s) wherein said weight percent is based on the total weight of the polymer.

To prepare the copolymers based on styrene and optionally other unsaturated compounds, mass or a combination of mass/suspension polymerization techniques are most commonly employed. Illustrative mass polymerization techniques are described in U.S. Pat. Nos. 2,727,884 and 4,782,127, which are incorporated herein by reference. Processes for the preparation of block copolymers of monovinylidene aromatic monomers and conjugated dienes are described in U.S. Pat. Nos. 5,242,984 and 5,134,968 both incorporated herein by reference.

Preferably the triol is a polyether triol and more preferably a polyoxyalkylene based triol. Preferably, such polyoxyalkylene oxide triol comprises a polyoxypropylene chain with a polyoxyethylene end cap. Such materials are well known in the art and initiators and alkylene oxides which may be used in the preparation of the triol are described hereinbefore. A particularly preferred polyether triol is a 1,2,3-propane triol initiated polyoxypropylene with a polyoxyethylene end cap. Preferably such triol has molecular weight of about 4,000 or greater, more preferably about 5,000 or greater and most preferably about 6,000 or greater. Preferably such triol has molecular weight of about 8,000 or less and more preferably about 7,000 or less. Below about 4,000 molecular weight the elongation and impact properties of the finally cured adhesive are too low for the intended use. Above about 8,000 molecular weight the adhesive prepared from the prepolymer is too elastomeric for the intended use. The triol preferably has a hydroxyl number which is high enough such that the adhesive prepared from the prepolymer cures rapidly enough and provides the desired open times. If the hydroxyl number is too low the adhesive cures too slowly and the desired open times and drive-away times cannot be achieved. The hydroxyl number should not be so high as to reduce the elongation of the cured adhesive prepared from the prepolymer. Preferably, the hydroxyl number of the triol is about 30 or greater and more preferably about 40 or greater. Preferably, the hydroxyl number of the triol is about 75 or less and more preferably about 60 or less.

The organic polymer particles dispersed in the triol preferably have a particle size which is large enough to improve the impact properties and elastomeric properties of the finally cured adhesive, but not so large so as to reduce the ultimate strength of the adhesive after about 60 minutes of cure. Preferably the particle size is about 10 microns or greater and more preferably the particle size is about 20 microns or greater. Preferably the particle size is about 50 microns or less and more preferably the particle size is about 40 microns or less. The triol dispersion contains a sufficient amount of organic polymer particles such that the adhesive upon cure has sufficient hardness for the desired use and not so much such that the cured adhesive has too much elasticity as defined by elongation. Preferably the dispersion contains about 20 percent by weight or greater of organic polymer particles copolymer based on the dispersion, preferably about 30 percent by weight or greater and more preferably about 35 percent by weight or greater. Preferably the dispersion contains about 60 percent by weight or less of organic polymer particles based on the dispersion, preferably about 50 percent by weight or less and more preferably about 45 percent by weight or less.

The dispersion of organic polymer particles in a triol is present in the prepolymer in an amount of about 9 percent by weight or greater of the prepolymer and more preferably about 10 percent by weight or greater, and about 18 percent by weight or or less of the prepolymer and more preferably about 12 percent by weight or less.

In one embodiment the thermoplastic polymer particles may be rubber-modified. Generally this involves blending an elastomeric or rubbery polymer with the thermoplastic polymer. A preferred rubbery material is acrylonitrile-butadiene-styrene interpolymer. Preferably, the rubber-modified thermoplastic polymer particles contain about 15 to about 25 percent by weight of rubber polymer particles.

In one embodiment the organic polymer particles comprise a polyurea, comprising the reaction product of a polyamine and a polyisocyanate. The polyurea preferably does not react with isocyanate-reactive moieties or isocyanate moieties. Preferably, the polyurea is prepared by the reaction of a polyamine, preferably a diamine, with a polyisocyanate, preferably a diisocyanate. The polyurea and polyamine are mixed and undergo immediate reaction at room temperature. Thereafter the polyurea is contacted with triols, preferably under high shear conditions to disperse the polyurea into the triol. Preferably the isocyanate used to prepare the polyurea is a cycloaliphatic or aliphatic polyisocyanate, as the use of cycloaliphatic and aliphatic isocyanates facilitate handling and stability of the polyurea. Preferably the polyurea has a urea functionality of about 8 percent or greater, more preferably about 10 percent or greater and most preferably about 15 percent or greater. Preferably the polyurea has a functionality of about 40 percent or less and more preferably about 20 percent or less. Functionality as used herein relative to polyureas refers to weight percent of urea groups present in the polyurea.

The polyurethane prepolymers of the invention may further comprise a plasticizer. The plasticizers useful in the prepolymer are common plasticizers useful in polyurethane adhesive applications and well known to those skilled in the art. The plasticizer is present in an amount sufficient to disperse the prepolymer in the final adhesive composition. The plasticizer can be added to the adhesive either during preparation of the prepolymer or during compounding of the adhesive composition. Preferably the plasticizer is present in about 1 percent by weight or greater of the prepolymer formulation (prepolymer plus plasticizer), more preferably about 18 percent by weight or greater and most preferably about 22 percent by weight or greater. Preferably the plasticizer is present in about 32 percent by weight or less of the prepolymer formulation and more preferably about 25 percent by weight or less.

The polyurethane prepolymer may be prepared by any suitable method, such as bulk polymerization and solution polymerization. The reaction to prepare the prepolymer is carried out under anhydrous conditions, preferably under an inert atmosphere such as a nitrogen blanket, to prevent crosslinking of the isocyanate groups by atmospheric moisture. The polyurethane prepolymer is preferably prepared by contacting the dispersion triol and the compounds or polymers containing isocyanate-reactive groups in the absence of catalyst and heating the mixture to 45° C. or greater, more preferably 48° C. or greater. The mixture is heated to a temperature of 55° C. or less, more preferably 49° C. or less. The polyisocyanate is then added to the mixture and the mixture is subjected to mixing so as to evenly disperse the polyisocyanate in the reaction mixture. Thereafter the polyurethane catalyst is added. After addition of the catalyst an exotherm generally results, preferably the exotherm peak is about 58° C. or greater and more preferably about 60° C. or greater. Preferably the exotherm peak is about 70° C. or less more preferably about 65° C. or less. Above about 70° C. the reaction mixture gels. Thereafter plasticizer may be added after the exotherm recedes, that is the temperature drops, to dilute the reactants and quench the reaction. The reaction should be run such that all free isocyanate-reactive moieties are reacted with isocyanate moieties. The reaction mixture preferably contains a standard polyurethane catalyst. Examples of such catalysts include the stannous salts of carboxylic acids, such as stannous octoate, stannous oleate, stannous acetate, and stannous laureate; dialkyltin dicarboxylates, such as dibutyltin dilaureate and dibutyltin diacetate; tertiary amines and tin mercaptides. Preferably, the reaction to prepare the prepolymer is catalyzed by stannous octoate. The amount of catalyst employed is generally between about 0.005 and about 5 percent by weight of the mixture catalyzed, depending on the nature of the isocyanate. The relative ratio of isocyanate groups to isocyanate-reactive groups should be such that the resulting prepolymer has no free isocyanate-reactive groups as such groups will react prematurely. Preferably the ratio of isocyanate groups to isocyanate-reactive groups is such that a reasonable advancement occurs. Preferably the equivalent ratio of isocyanate groups to the isocyanate-reactive groups is about 1.2 or greater and more preferably about 1.4 or greater. The equivalent ratio should not be so low so as to prevent complete reaction of the isocyanate-reactive moieties. Preferably the equivalent ratio of isocyanate groups to the hydroxyl groups is about 2.0 or less and most preferably about 1.6 or less.

The polyurethane prepolymers are present in the adhesive composition in an amount sufficient such that when the resulting adhesive cures substrates are bound together. Preferably the lap shear strengths of bonds so formed is about 30 psi (206 kPa) or greater after about 60 minutes and more preferably after about 30 minutes. Preferably the polyurethane prepolymers are present in an amount of 55 parts by weight of the adhesive composition or greater, more preferably 60 parts by weight or greater and most preferably 69 parts by weight or greater. Preferably the polyurethane prepolymers are present in an amount of about 80 parts by weight of the adhesive composition or less, more preferably about 75 parts by weight or less and even more preferably 70 parts by weight or less.

The adhesive of the invention may be formulated with fillers and additives known in the prior art for use in adhesive compositions. By the addition of such materials physical properties such as viscosity flow rates and the like can be modified. However, to prevent premature hydrolysis of the moisture sensitive groups of the polyurethane prepolymer, fillers should be thoroughly dried before admixture therewith.

Optional components of the adhesive of the invention include reinforcing fillers. Such fillers are well known to those skilled in the art and include carbon black, titanium dioxide, calcium carbonate, surface treated silicas, titanium oxides fume silica, talc, and the like. Preferred reinforcing fillers comprise carbon black. In one embodiment, more than one reinforcing filler may be used, of which one is carbon black and a sufficient amount of carbon black is used to provide the desired black color to the adhesive. The reinforcing fillers are used in sufficient amount to increase the strength of the adhesive and to provide thixotropic properties to the adhesive. Preferably the reinforcing filler is present in an amount of about 1 part by weight of the adhesive composition or greater, more preferably about 15 parts by weight or greater and most preferably about 17 parts by weight or greater. Preferably the reinforcing filler is present in an amount of about 40 parts by weight of the adhesive composition or less, more preferably about 25 parts by weight or less and most preferably about 23 parts by weight or less.

Among optional materials in the adhesive composition are clays. Preferred clays useful in the invention include kaolin, surface treated kaolin, calcined kaolin, aluminum silicates and surface treated anhydrous aluminum silicates. The clays can be used in any form which facilitates formulation of a pumpable adhesive. Preferably the clay is in the form of pulverized powder, spray-dried beads or finely ground particles. Clays may be used in an amount of 0 parts by weight of the adhesive composition or greater, more preferably about 1 part by weight or greater and even more preferably about 6 parts by weight or greater. Preferably the clays are used in an amount of about 20 parts by weight or less of the adhesive composition and more preferably about 10 parts by weight or less.

The adhesive composition of the invention may further comprise a catalyst known for promoting the cure of polyurethanes in the presence of moisture. Preferable catalysts include metal salts such as tin carboxylates, organo silicon titanates, alkyl titanates, bismuth carboxylates, and dimorpholinodiethyl ether or alkyl-substituted dimorpholinodiethyl ethers. Among preferred catalysts are bismuth octoate, dimorpholinodiethyl ether and (di-(2-(3,5-dimethylmorpholino)ethyl)) ether. Such catalysts, when employed are preferably employed in an amount based on the weight of the adhesive composition of about 0 parts by weight or greater, more preferably about 0.1 parts by weight or greater, even more preferably about 0.2 parts by weight or greater and most preferably about 0.4 parts by weight or greater. Such catalysts are preferably employed in an amount, based on the weight of the adhesive composition of about 5 parts by weight or less, more preferably about 1.75 parts by weight or less, even more preferably about 1 part by weight or less and most preferably about 0.6 parts by weight or less.

The adhesive composition of this invention may further comprise plasticizers so as to modify the rheological properties to a desired consistency. Such materials should be free of water, inert to isocyanate groups and compatible with a polymer. Suitable plasticizers are well known in the art and preferable plasticizers include alkyl phthalates such as dioctylphthalate or dibutylphthalate, partially hydrogenated terpene commercially available as "HB-40", trioctyl phosphate, epoxy plasticizers, toluene-sulfamide, chloroparaffins, adipic acid esters, castor oil, toluene and alkyl naphthalenes. The amount of plasticizer in the adhesive composition is that amount which gives the desired rheological properties and which is sufficient to disperse the catalyst in the system. The amounts disclosed herein include those amounts added during preparation of the prepolymer and during compounding of the adhesive. Preferably plasticizers are used in the adhesive composition in an amount of about 0 parts by weight or greater based on the weight of the adhesive composition, more preferably about 5 parts by weight or greater and most preferably about 10 parts by weight or greater. The plasticizer is preferably used in an amount of about 45 parts by weight or less based on the total amount of the adhesive composition and more preferably about 40 parts by weight or less.

The adhesive of this invention may further comprise stabilizers which function to protect the adhesive composition from moisture, thereby inhibiting advancement and preventing premature crosslinking of the isocyanates in the adhesive formulation. Included among such stabilizers are diethylmalonate and alkylphenol alkylates. Such stabilizers are preferably used in an amount of about 0.1 parts by weight or greater based on the total weight of the adhesive composition, preferably about 0.5 parts by weight or greater and more preferably about 0.8 parts by weight or greater. Such stabilizers are used in an amount of about 5.0 parts by weight or less based on the weight of the adhesive composition, more preferably about 2.0 parts by weight or less and most preferably about 1.4 parts by weight or less.

Optionally the adhesive composition may further comprise a thixotrope. Such thixotropes are well known to those skilled in the art and include alumina, limestone, talc, zinc oxides, sulfur oxides, calcium carbonate, perlite, slate flour, salt (NaCl), cyclodextrin and the like. The thixotrope may be added to the adhesive of composition in a sufficient amount to give the desired rheological properties. Preferably the thixotrope is present in an amount of about 0 parts by weight or greater based on the weight of the adhesive composition, preferably about 1 part by weight or greater. Preferably the optional thixotrope is present in an amount of about 10 parts by weight or less based on the weight of the adhesive composition and more preferably about 2 parts by weight or less.

Other components commonly used in adhesive compositions may be used in the adhesive composition of this invention. Such materials are well known to those skilled in the art and may include ultraviolet stabilizers and antioxidants and the like.

As used herein all parts by weight relative to the components of the adhesive composition are based on 100 total parts by weight of the adhesive composition.

The adhesive composition of this invention may be formulated by blending the components together using means well-known in the art. Generally the components are blended in a suitable mixer. Such blending is preferably conducted in an inert atmosphere in the absence of oxygen and atmospheric moisture to prevent premature reaction. It may be advantageous to add any plasticizers to the reaction mixture for preparing the isocyanate containing prepolymer so that such mixture may be easily mixed and handled. Alternatively, the plasticizers can be added during blending of all the components. Once the adhesive composition is formulated, it is packaged in a suitable container such that it is protected from atmospheric moisture and oxygen. Contact with atmospheric moisture and oxygen could result in premature crosslinking of the polyurethane prepolymer-containing isocyanate groups.

The adhesive composition of the invention is used to bond porous and nonporous substrates together. The adhesive composition is applied to a substrate and the adhesive on the first substrate is thereafter contacted with a second substrate. In preferred embodiments, the surfaces to which the adhesive is applied are cleaned and primed prior to application, see for example U.S. Pat. Nos. 4,525,511, 3,707,521 and 3,779,794, relevant parts of all are incorporated herein by reference. Generally the adhesives of the invention are applied at ambient temperature in the presence of atmospheric moisture. Exposure to atmospheric moisture is sufficient to result in curing of the adhesive. Curing can be accelerated by the addition of additional water or by applying heat to the curing adhesive by means of convection heat, microwave heating and the like. Preferably the adhesive of the invention is formulated to provide a working time of about 6 minutes or greater more preferably about 10 minutes or greater. Preferably the working time is about 15 minutes or less and more preferably about 12 minutes or less.

The adhesive composition is preferably used to bond glass to other substrates such as metal or plastics. In a preferred embodiment the first substrate is a glass window and the second substrate is a window frame. In another preferred embodiment the first substrate is a glass window and the second substrate is a window frame of an automobile.

Preferably the adhesive compositions of the invention demonstrate a lap shear-strength after 60 minutes from application to substrates of about 30 psi (206 kPa) or greater, more preferably 60 psi (412 kPa) or greater and most preferably 80 psi (548 kPa) or greater. Lap shears are determined according to ASTM D-3163. Preferably the cured adhesive compositions of the invention demonstrate an elongation of 300 percent or greater as determined according ASTM D-638-91 and preferably greater than about 600 percent. Preferably the elongation is 700 percent or less.

Viscosities as described herein are determined according to the following procedure: measured using the Brookfield Viscometer, Model RVT at standard conditions of 72° F. and 50 percent RH. The viscometer is calibrated using silicone oils of known viscosities, which vary between 5,000 cps to 50,000 cps. A set of RV spindles that attach to the viscometer are used for the calibration. All measurements are done using the No. 5 spindle at a speed of 1 revolution per second for 5 minutes until the viscometer equilibrates. The viscosity corresponding to the equilibrium reading is then calculated using the calibration.

Molecular weights as described herein are determined according to the following procedure: determined using the Waters Model 590 Gel Permeation Chromatograph. This unit is connected to a multiwavelength detector and a differential refractometer to measure the elution volume. A column of styrogel is used for the size exclusion and it can determine molecular weights from 250 to 50,000. The molecular weight of the prepolymer is then determined by measuring the elution volume through this column using tetrahydrofuran as the eluting solvent. The molecular weight is then calculated from a calibration curve of molecular weight vs. elution volume obtained from a polystyrene polyethylene glycol column. The quoted molecular weights are weight average molecular weights unless otherwise specified.

In reference to polyurethane prepolymers, average isocyanate functionality is determined according to the following formula, $$\frac{\text{moles diol-}NCO \text{ adduct} \times \text{diol-}NCO \text{ functionality} + \text{moles triol-}NCO \text{ adduct} \times \text{triol-}NCO \text{ functionality} + \text{moles excess polyisocyanate monomer} \times \text{its functionality}}{\text{moles diol-}NCO \text{ adduct} \times \text{triol-}NCO \text{ adduct} + \text{moles excess polyisocyanate monomer}}$$

wherein moles excess polyisocyanate monomer are calculated according to the following formula, $$\text{moles of isocyanate} - (2 \times \text{moles of diol} + 3 \times \text{moles of triol})$$

and the moles of isocyanate, diol and triol are based on the amount of each in the starting formulation.

The theoretical average molecular weight of the prepolymer is calculated as equal to the average isocyanate functionality times the isocyanate equivalent weight of the prepolymer.

Functionality of the raw material is generally disclosed by the raw material supplier. It can be determined empirically by means of titrating the polyol or isocyanate to determine the average number functional group per molecule. One skilled in the art knows how to determine the functionality based-on data developed by titration.

Illustrative Embodiments of the Invention

The following examples are provided to illustrate the invention, but are not intended to limit the scope thereof. All parts and percentages are by weight unless otherwise indicated.

Preparation of Prepolymer

A polyether polyurethane prepolymer was prepared by mixing 651.5 g of a polyoxypropylene diol having an average molecular weight of 2,000 with 947.2 g of a polyoxypropylene triol having an average molecular weight of 4,500 and 480 g of a styrene acrylonitrile dispersed polyoxypropylene triol with an average molecular weight of 5,400. Mixing was carried out in a reactor by heating the mixture to 48° C. 320 g of diphenylmethane-4,4'-diisocyanate and 0.17 g of stannous octoate was added to the mixture. The whole mixture was then reacted for one hour. Finally, 800 g of a plasticizing agent dialkyl phthalate was added to the mixture and the mixing was continued for one hour.

Preparation of Adhesive Composition

An adhesive composition was prepared using 1127 g of prepolymer of this example in a planetary mixer, degassed for 20 minutes 376 g of carbon black and 96 g of clay was added to the mixer and mixed for 20 minutes under vacuum. Finally 8 g of dimorpholinodiethyl ether (DMDEE) and 4 g of bismuth octoate (BiO) was added as catalyst to the mixture and mixed for another 20 minutes and packaged in tubes.

Additional polyurethane prepolymers and adhesive compositions were prepared as described above using the components and amounts described in Table 1.

TABLE 1

| Prepolymer Components/Example | 1 (g) | 2 (g) | 3 (g) | 4 (g) |
|---|---|---|---|---|
| Polyoxypropylene[1] diol | 651.5 | 320 | 640 | 363.68[4] |
| Polyoxypropylene[2] triol | 947.2 | 384 | 768 | 527.04[5] |
| SAN-dispersed in[3] polyoxypropylenetriol | 480 | 288 | 576 | 0 |
| Diphenylmethane-4,4'-diisocyante | 320 | 176 | 320 | 160.6 |
| Stannous Octoate | 0.17 | 0.08 | 0.17 | 0.17 |
| Dialkyl phthalate | 800 | 432 | 896 | 525.44 |
| Adhesive composition | | | | |
| Prepolymer | 1127 | 564 | 1127 | 270.16 |
| Carbon Black | 376 | 188 | 376 | 136.65 |
| Clay | 96 | 48 | 96 | |
| Dimorpholinodiethyl ether | 8 | 8 | 8 | 0.95 |
| Bismuth octoate | 4 | 4 | 4 | |
| Plasticizer | | 8 | 8 | |

[1] 2000 molecular weight - available from Olin Chemical under trade name Poly G® 55-56
[2] 4500 molecular weight - available from BASF under trade name TPE 4542
[3] 5400 molecular weight - available from BASF under the trade name 994 LV
[4] Polyoxypropylene diol having a MW of 2000 available from PPG under the trade name PPG 2025
[5] Polyoxypropylene triol having a molecular weight of 4500 available from Olin Chemical under the trade name Poly G 85-36

In Example 4 the reaction mixture was heated to 55° C. before addition of polyisocyanate and catalyst.

The adhesives of Examples 1 to 4 are tested for working time according to the method described below and lap shear strengths according to ASTM D-3163. Skinning time was determined by the following procedure. An adhesive bead of ¼"×¼" (6.35 mm×6.35 mm) was dispensed on release paper. Every two minutes a tongue depressor was lightly pressed on the surface of the bead. The earliest time which there is no adhesive residue on the tongue depressor after pressing it on the bead was recorded as the skinning time. The results are compiled in Table 2.

TABLE II

| Adhesive | Example 1 | Example 2 | Example 3 | Example 4 |
|---|---|---|---|---|
| % B.O. | 0.23 | 0.23 | 0.47 | 0.00 |
| % DMDEE | 0.47 | 0.47 | 0.47 | 0.3 |
| % Plasticizer | 0.47 | 0.47 | 0.00 | 0.00 |
| Working time (minutes) | 10.5 | 13 | 10 | 20 |
| Lap Shear Strength | | | | |
| 30 minutes psi(KPa) | 12 (82.2) | 17.3 (119) | 11 (75.4) | 2.5 (17.1) |
| 60 minutes psi(KPa) | 32.5 (223) | 37.3 (256) | 40 (274) | 15 (102) |
| 90 minutes psi(KPa) | 91.5 (627) | 78.3 (536) | 85.7 (587) | 40 (274) |

A comparison of Examples 1 and 4 demonstrate that the use of a styrene-acrylonitrile copolymer dispersed in a triol when compared to a triol without the copolymer, results in a lower skinning time and higher lap shear strengths at 30, 60 and 90 minutes.

What is claimed is:

1. A process for binding two substrates together which comprises contacting a one-part adhesive composition with at least one of the substrates and contacting the substrates together along the portion of the substrate(s) to which the adhesive composition has been applied before the adhesive composition applied cures and allowing the adhesive composition to cure and bond the substrates together wherein the one-part adhesive composition comprises a polyurethane prepolymer comprising the reaction product of;

A) one or more polyisocyanates;

B) a mixture of one or more polyether diols and one or more polyether triols;

C) a dispersion triol containing from about 10 to about 60 percent by weight based on the dispersion of organic polymer particles having a particle size of from about 10 to about 50 microns and which are not reactive with isocyanate or isocyanate-reactive moieties wherein the organic polymer is derived from styrene, halo or alkyl substituted styrene; or a rubber modified polymer derived from styrene, or halo or alkyl substituted styrene;

and a catalyst comprising the mixture of a dimorpholino diethyl ether or a alkyl substituted dimorpholino diethyl ether and a bismuth carboxylate;

wherein the prepolymer has a free isocyanate content of from about 0.8 to about 2.2 percent.

2. A process according to claim 1 wherein the one-part adhesive comprises:

1) from about 55 to about 80 parts by weight of prepolymer;

2) from about 15 to about 40 parts by weight of a reinforcing filler;

3) from about 1 to about 20 parts by weight of clay;

4) from about 0.1 to about 0.6 parts by weight of a dimorpholino diethylether or alkyl substituted dimorpholino diethyl ethers and from about 0.1 to about 0.6 of bismuth octoate;

5) from about 5 to about 45 parts by weight of plasticizer; wherein the adhesive contains 100 parts.

3. The process according to claim 1 wherein the first substrate is a glass window and the second substrate is a window frame.

4. The process according to claim 3 wherein the second substrate is a window frame of an automobile.

5. A process according to claim 1 wherein the adhesive composition further comprises a plasticizer.

6. A process according to claim 5 wherein the adhesive composition further comprises a reinforcing filler and clay.

7. A process according to claim 1 wherein the polyurethane prepolymer comprises

A) from about 5 to about 20 percent by weight of a polyisocyanate;

B)
i) from about 10 to about 30 percent by weight of a diol,
ii) from about 15 to about 40 percent by weight of a triol;

C) from about 20 to about 40 percent by weight of a dispersion triol; and

D) from about 1 to about 32 percent by weight of a plasticizer.

8. A process according to claim 1 wherein the organic polymer particles comprise a styrene acrylonitrile copolymer.

* * * * *